United States Patent [19]

Stepanek et al.

[11] 4,238,217
[45] Dec. 9, 1980

[54] SYSTEM FOR THE FORMATION INTO PELLETS OF MIXTURES OF RAW MATERIALS FOR GLASS

[75] Inventors: Premek Stepanek, Garmisch-Partenkirchen; Hugo Bleckmann, Bonn, both of Fed. Rep. of Germany

[73] Assignee: Klöckner-Humboldt-Wedag AG, Fed. Rep. of Germany

[21] Appl. No.: 447

[22] Filed: Jan. 2, 1979

[30] Foreign Application Priority Data

Dec. 30, 1977 [DE] Fed. Rep. of Germany ....... 2759021

[51] Int. Cl.³ .............................................. C03B 3/00
[52] U.S. Cl. ......................................... 65/335; 65/27; 65/134; 106/DIG. 8
[58] Field of Search ........................... 65/27, 134, 335; 106/DIG. 8

[56] References Cited

U.S. PATENT DOCUMENTS

| | | | |
|---|---|---|---|
| 3,065,090 | 11/1962 | Hopkins | 65/27 X |
| 3,545,988 | 12/1970 | Slade | 65/27 X |
| 3,726,697 | 4/1973 | Mod et al. | 65/27 |

FOREIGN PATENT DOCUMENTS 472908 10/1973 U.S.S.R. .................................. 65/134

*Primary Examiner*—Arthur D. Kellogg
*Attorney, Agent, or Firm*—Hill, Van Santen, Steadman, Chiara & Simpson

[57] ABSTRACT

A method and apparatus is disclosed for the formation of lumps or pellets of mixtures of raw materials for glass. Soda and water are added to a mixture of the raw materials in a mixing container. The resulting mixture is at least partially heated for vaporization of the water and the mixture is compressed in a roller press. Pellets or lumps result which are fed to a heat exchanger for pre-heating prior to introduction into a melting furnace. Exhaust gases from a furnace are fed to the heat exchanger and also to the mixing container and a supply container for the roller press.

2 Claims, 1 Drawing Figure

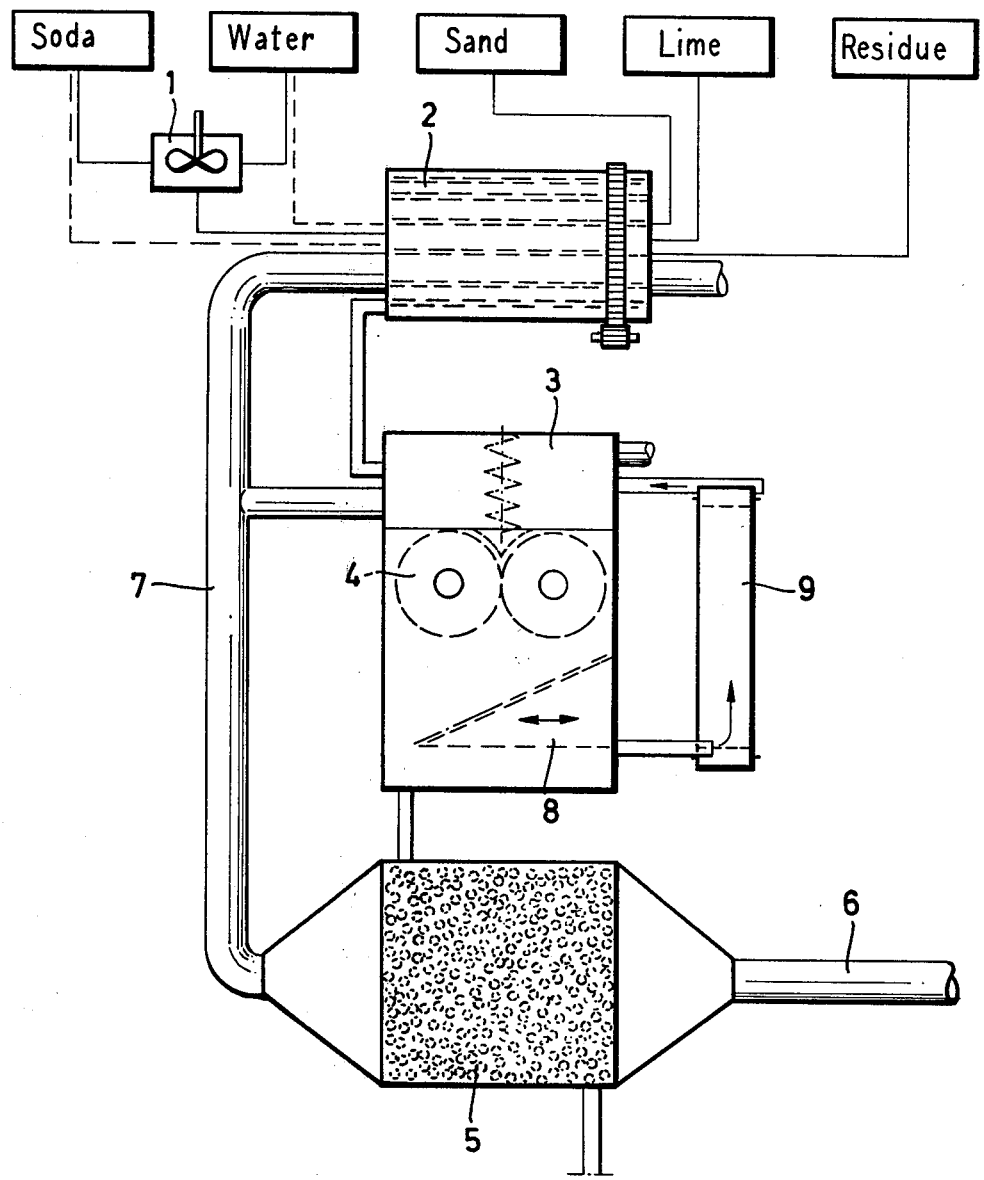

SYSTEM FOR THE FORMATION INTO PELLETS OF MIXTURES OF RAW MATERIALS FOR GLASS

BACKGROUND OF THE INVENTION

The invention relates to a method for the formation of lumps or pellets containing soda mixtures of raw material for glass, and particularly to such mixtures which pass through a heat exchanger for preheating.

For the production of glass, the costs of energy constitute an appreciable portion of the total costs. A possibility for diminishing the energy costs results by transferring into heat exchangers the residual heat of the furnace exhaust gases to the raw materials for glass so that the latter arrive preheated in the melting tank. For this it is advantageous to supply the raw materials for glass in pellets or lumps rather than in fine-grained or pulverulent form to the smelting furnace.

Methods for making the lumps or pellets of mixtures of raw materials for glass are known such as, for example, from the Offenlegungsschrift No. 25 13 082 incorporated herein by reference. Here, the raw materials for glass with their natural moisture content of about 3% are pressed by a roller press into a material flow which is inserted in adhering manner into the smelting furnace.

SUMMARY OF THE INVENTION

It is an object of the invention to provide a method and an apparatus by which the formation into pellets of the mixture of raw material for glass is possible in a manner particularly favorable for the heat-exchanger use. Thus, the pieces of raw material mixture for glass have a solidity or compression not attainable previously without chemical binding means, such as cement or water glass. Furthermore, the raw material constituents are formed completely into pellets or lumps so that only pieces of mixture, and no portions in the form of dust, are supplied to the furnace.

The problem is solved in that water, particularly together with soda in the form of a soda solution, is added to the mixture. Through the addition of water, particularly in the form of a soda solution, and a subsequent mixture of the soda solution with the other raw materials, there results a previously unattainable complete distribution of the soda in dissolved form between the individual components of raw material. This leads to a manifold, uniform salt-bridge formation between the individual components when the water through heating is withdrawn again entirely or partially from the mixture. Therefore, an advantageous solidification of the mixture is attained without chemical binding.

In a development of the invention, the water-containing mixture is solidified or compressed mechanically, particularly by means of a briquette roller press. Through the mechanical solidification or compression, the positive effect of the multiply formed salt bridges is further reinforced; therefore an increase in the specific weight also takes place. Solidity or compression and specific weight lie above the values attainable by means of granulation. Nevertheless, a favorable form similar to granulated balls is attained.

In a further embodiment of the invention, the water-containing mixture is preheated and/or pre-dried before the solidification. Through the predrying, the salt-bridge formation is reinforced so that the positive effect of the mechanical compression or solidification may be further increased.

In a development of the invention, it is further provided that the water content of the mixture upon solidification is 3% to 5%. A water content of 3% to 5% is especially favorable. On the one hand, it is sufficiently low so that only a small quantity of water must be vaporized in the furnace or in the preheater. On the other hand, the water acts as a lubricant and facilitates the compression. This is particularly important for the briquette roller pressing. Additionally, there results a favorable predrying of about 40% to 70% which leads to especially great solidification when a normal portion of soda of about 15% to 16% introduces 6% water into the mixture as saturated solution.

In another development of the invention, the preheating is carried out up to a temperature preferably between 100° C. and 200° C., at which water is withdrawn from the mixture by means of vaporization. Through the vaporization provided, the withdrawal of water is attained especially rapidly. Through the withdrawal of water, on account of the supersaturation of the solution, there is formed between the solid particles of the mixture a plurality of salt bridges. The adhesive forces which cause the amalgamation into a solid bonded structure are further increased by the plurality of newly resulting soda crystals, which have a very great reaction capacity when they are further compressed so that there results a solidification entirely unattainable with previous methods. Nevertheless, the drying temperature is of such a value that a conventional roller pressing as is ordinarily used for briquetting can be used.

In another development of the invention the preheating and/or drying takes place in a rotary drum dryer. A drum dryer is especially adapted to mix and to dry at the same time. Simultaneously, particularly in the case of built-in lifts, a good direct contact is attained between drying gases and mixtures which leads to a rapid drying.

In a further embodiment of the invention the solidified or compressed mixture of glass raw material passes through a heat exchanger for the further preheating subsequent to the solidification. Through the further preheating, the residual water is almost completely driven out. In the smelting furnace, therefore, almost water-free lumpy mixtures of raw material arrive which are very solid and highly preheated. From this results an especially low use of heat not attainable until now.

In a further embodiment, the mixture portions which have not become lumpy during the compression or solidification are conveyed again for compression or solidification. This embodiment further improves the method since the portions of mixture which, for example, break off from the edges of the individual briquettes in the briquette roller press or pass through between the briquettes through the roller gap, are still however briquetted in accordance with the invention.

In a further embodiment of the invention, before the solidification and/or in the heat exchanger, cooling or exhaust gases of the smelting furnace are used for the preheating. Through this embodiment, it is advantageously possible to have available at favorable cost the heat energy required for the drying and compression and to make use of the exhaust gas heat.

In a further embodiment of the invention the exhaust gases of the smelting furnace first are supplied to the heat exchanger and then the preheating device. Since the exhaust gases are cooled in the heat exchanger to a temperature of 200° C. to 300° C., therefore also the residual heat content may still be made use of in order to attain a mixture preheating to 100° C. to 200° C. At the same time the heat supply to the mixture takes place so that the solidification device is not overheated. It operates in a temperature range in which neither embrittlement nor corrosion phenomena are to be expected.

For carrying out the method of the invention an apparatus is provided which has a soda solution container; a mixing container preferably with heating devices for the soda solution and the other raw materials for the glass; a supply container for the solidification device preferably likewise with heating devices; a solidification or compression device which is preferably a briquette roller press; and a heat exchanger. With this apparatus, there is advantageously available an installation for the formation of lumps or pellets according to the invention and the preheating of the raw materials for glass.

BRIEF DESCRIPTION OF THE DRAWING

The drawing diagrammatically illustrates the individual parts of the invention and also illustrates the path of raw materials for the glass.

DESCRIPTION OF THE PREFERRED EMBODIMENTS

The main constituents for the glass production, particularly for the production of plate glass, are sand, soda, and lime. Furthermore, there is also added a series of additive substances in small quantity, here designated as residue. The soda is particularly introduced as light soda which may be easily processed.

The intermixing of soda and water occurs in the soda solution container 1. The water-soda ratio in the container 1 is thereby advantageously selected so that a saturated solution or an almost saturated solution results. Alternatively, however, also soda and/or water may be introduced individually into the mixer 2 if other water-additive conditions are to be attained. The soda solution arrives out of the solution container 1 into the mixer 2, in which it is intermixed with the sand, the lime and the remaining additive substances. Through the gas conduit 7 the mixer 2 is acted on by precooled exhaust gases so that in its interior, a temperature results above the vaporization temperature of the water. In case sufficient residual energy is not present for drying by the precooled exhaust gases, the mixer 2 may also receive an additional heating, not shown, which may operate electrically or with gas. Through vaporization, a portion of the moisture may be already withdrawn from the mixture of sand, soda, lime and the remaining substances so that the dissolved soda partially precipitates out again and is added to the other components in a fine distribution. Therefore many small crystals result capable of reaction with large adhesion surfaces and between the powder and sand grains. The mixer 2 is preferably constructed as a drum dryer and mixer with built-in lift devices. It may, however, also be a container mixer or the like. The operational mode of the mixer 2 is preferably discontinuous.

From the mixer 2 the mixture arrives in the container 3 out of which it is continuously supplied to the briquette roller press 4. Also, the supply container 3 may be heated so that the mixture with a temperature lying above 100° C., with low water content, and containing mostly finely divided and actively effective soda arrives at the briquette roller press 4. The supply takes place normally without mechanical aids. It may, however, also utilize stuffing worm drives. Behind the briquette roller press 4, the mixture portions not solidified or compressed to the desired forms may be sifted in the sieve 8 and guided back in circulation in front of the briquette roller press 4. The mixture portions, which according to the invention are formed into briquettes preferably have an egg shape, arrive into the heat exchanger 5. Here they are preheated, preferably in a cross or transverse current by means of the furnace exhaust gases. From the heat exchanger 5 they arrive in dosaged form into the smelting tank, here not shown. The furnace exhaust gases which arrive through the conduit 6 into the heat exchanger 5, are conveyed on through the conduit 7. They are then distributed and forwarded both to the container 3 as well as also to the mixer 2 with the mixer 2 receiving the larger portion. Subsequently, the exhaust gases at the mixer 2 and the container 3 are conveyed into an exhaust gas fireplace, after they are freed from dust, as the case may be, preferably through cyclones and dry filters. The dust separated off is, if need be, again added to the mixture.

The method according to the invention is especially adapted to mixtures with high portions of dust form products. Through the formation of lumps or pellets of the mixture of raw material for glass according to the invention, it is possible to also introduce the soda as light soda, if light soda is already provided, to prevent deposits of the light soda in the regenerative chambers, etc. In connection with the utilization of the residual heat of the exhaust gases, it is possible, particularly upon introduction of light soda, to have a very appreciable increase in the economy of the glass production.

Without departing from the scope of the invention, it is possible to make all basic materials for glass lumpy, even if no soda is introduced. Merely a form must be selected in which the predrying essential for the consistency according to the invention may be carried out before the solidification. The predrying takes place, however, only to such an extent that a minimum amount of water remains in the mixture, which is necessary as lubrication and for the improvement of the adhesion during the solidification.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A system for the formation into lumps or pellets of mixtures of raw materials for glass to be melted in a furnace, comprising:
    a furnace having a hot exhaust;
    a mixing container;
    means for supplying soda, water, and raw materials for the glass to the mixing container;
    a supply means for feeding a mixture from the mixing container to a solidification means,
    said solidification means forming said mixture into lumps or pellets; and
    a heat exchanger means connected to the hot exhaust for heating the lumps or pellets received from the solidification means; the hot exhaust being connected to supply heat to the mixing container after the heat exchanger.

2. The system of claim 1 wherein the hot exhaust is also connected to supply heat to the supply means after the heat exchanger.

* * * * *